(No Model.) 6 Sheets—Sheet 1.

H. HARDWICK.
JACQUARD MECHANISM FOR LOOMS.

No. 441,486. Patented Nov. 25, 1890.

Witnesses:
David S. Williams
Alex Darkoff

Inventor:
Harry Hardwick
by his Attorneys
Howson & Howson

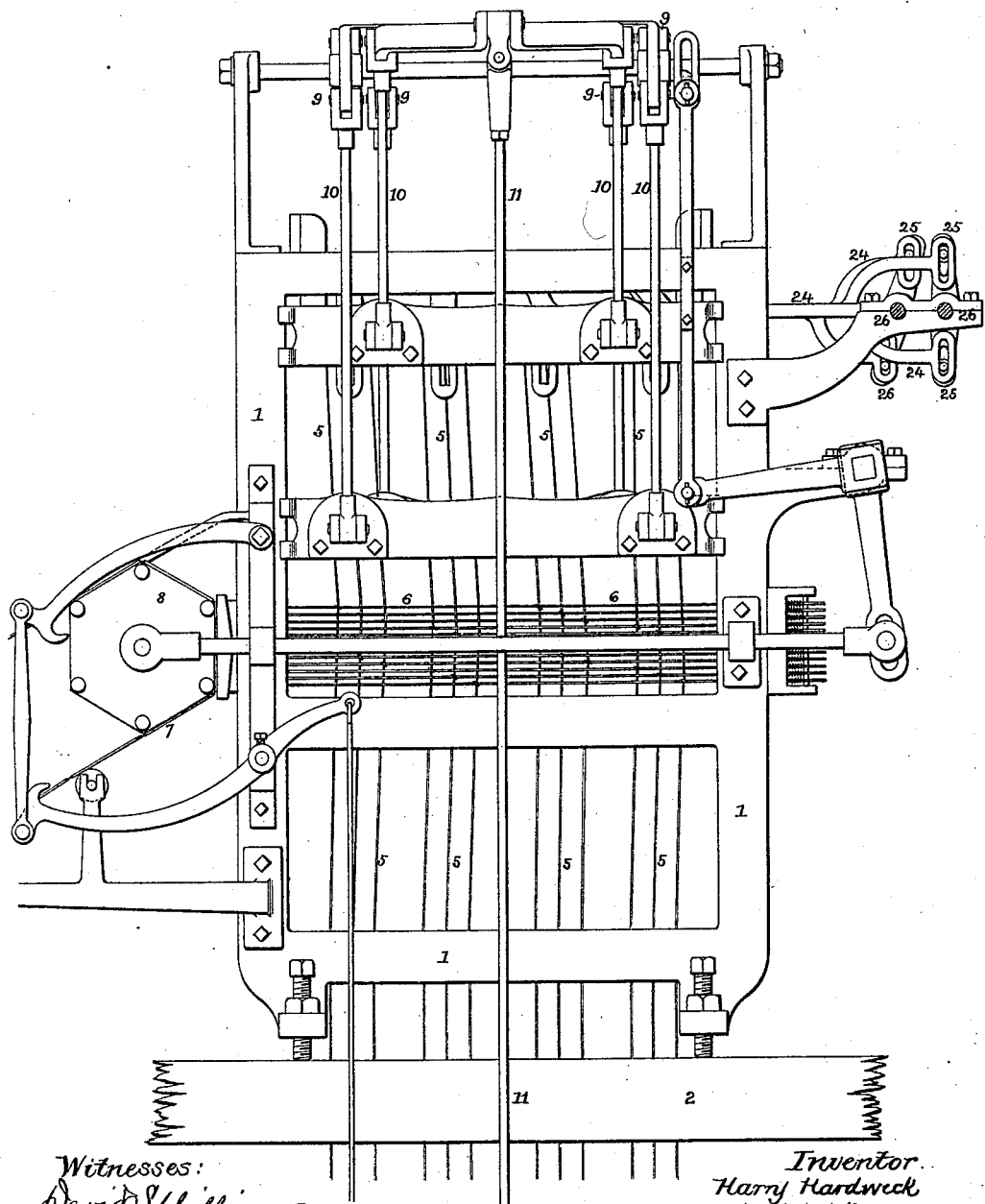

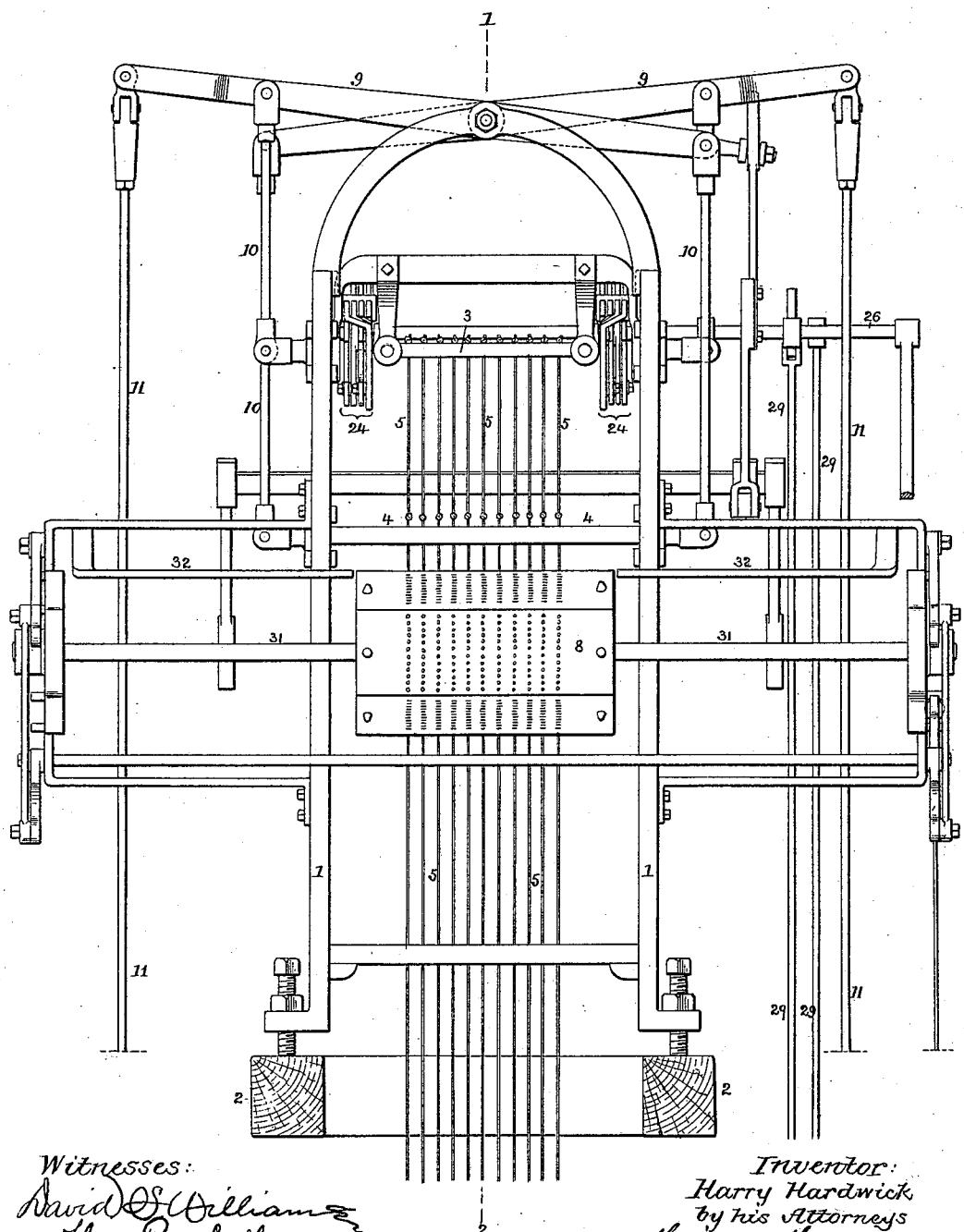

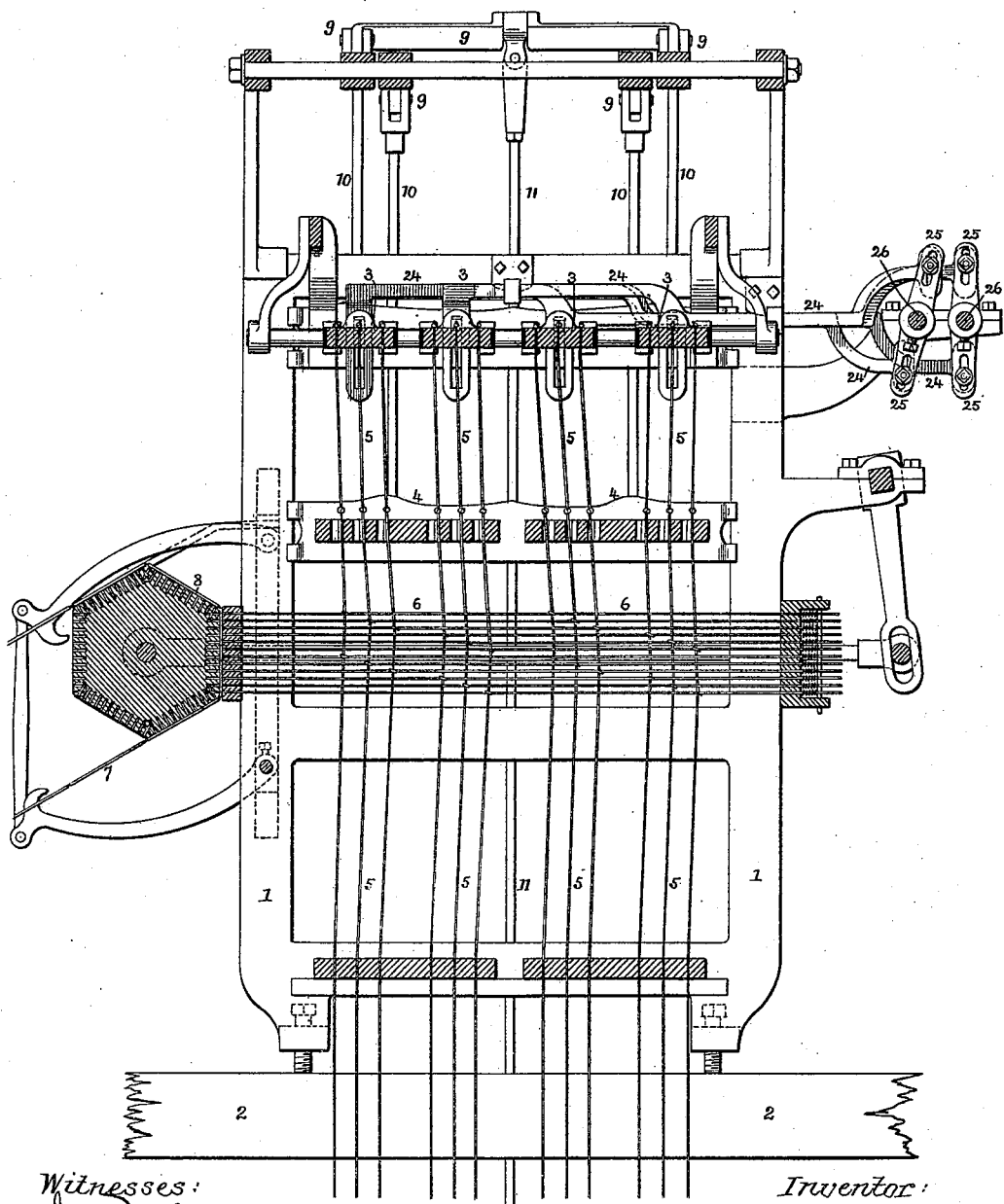

(No Model.)  6 Sheets—Sheet 5.
H. HARDWICK.
JACQUARD MECHANISM FOR LOOMS.
No. 441,486.  Patented Nov. 25, 1890.
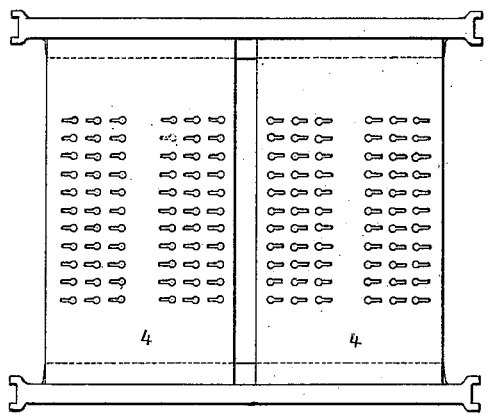
FIG. 6.
FIG. 5.
FIG. 16.
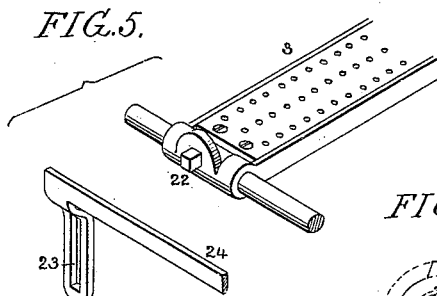
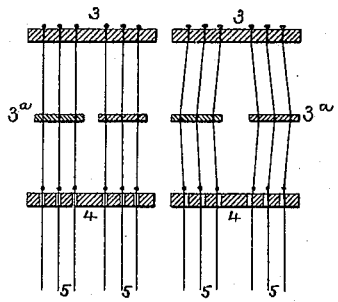
FIG. 7.
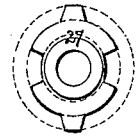
FIG. 17.
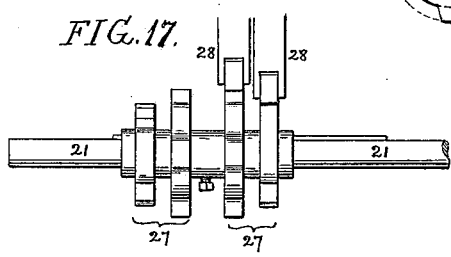
FIG. 18.
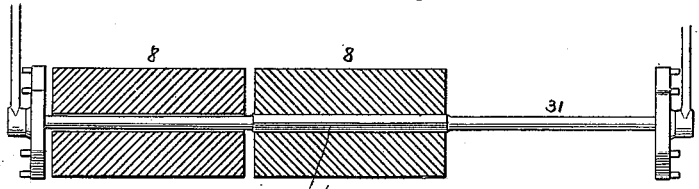
Witnesses:
David J. Williams
Aby Darkoff
Inventor:
Harry Hardwick
by his Attorneys
Howson & Howson (No Model.) 6 Sheets—Sheet 6.

H. HARDWICK.
JACQUARD MECHANISM FOR LOOMS.

No. 441,486. Patented Nov. 25, 1890.

Witnesses:
David J. Williams
Alex Barkoff

Inventor:
Harry Hardwick
by his Attorneys
Howson & Howson

UNITED STATES PATENT OFFICE.

HARRY HARDWICK, OF PHILADELPHIA, PENNSYLVANIA.

JACQUARD MECHANISM FOR LOOMS.

SPECIFICATION forming part of Letters Patent No. 441,486, dated November 25, 1890.

Application filed May 15, 1888. Serial No. 273,956. (No model.)

*To all whom it may concern:*

Be it known that I, HARRY HARDWICK, a citizen of the United States, and a resident of Philadelphia, Pennsylvania, have invented certain Improvements in Jacquard Mechanisms for Looms, of which the following is a specification.

One object of my invention is to so construct Jacquard mechanism for looms as to dispense with the necessity of using harness-shafts such as are now employed in certain classes of looms, a further object of my invention being to provide for using two different sets of cards without necessitating the detaching of either set when the other set is brought into use. These objects I attain in the manner hereinafter set forth, reference being had to the accompanying drawings, in which—

Figure 1:
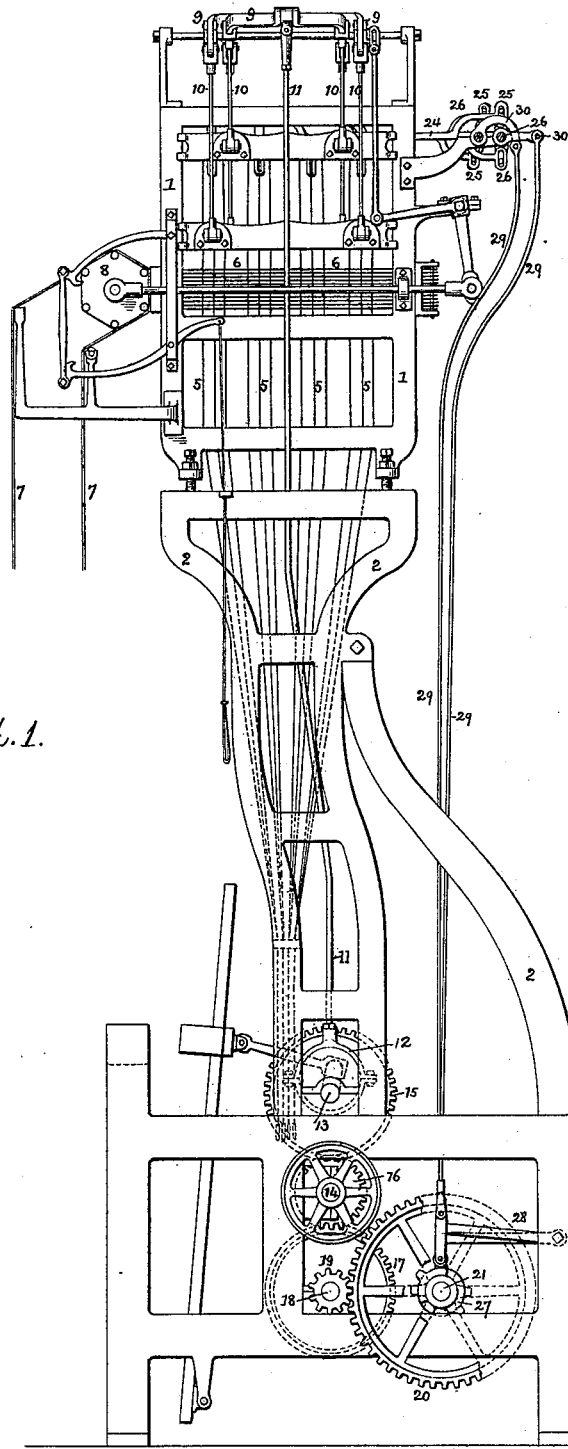
Figure 8:
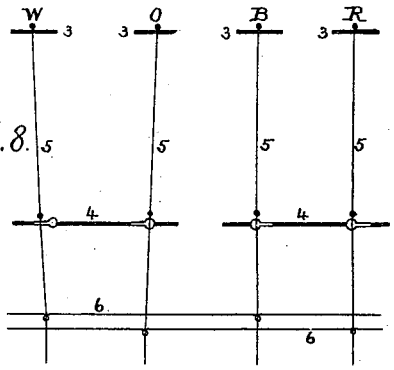
Figure 12:
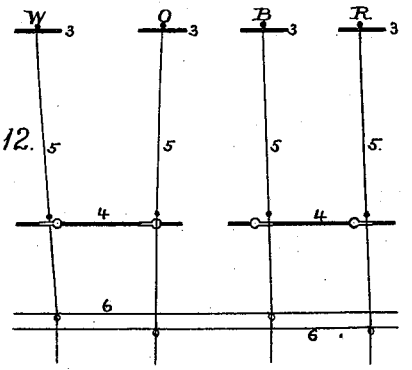
Figure 9:
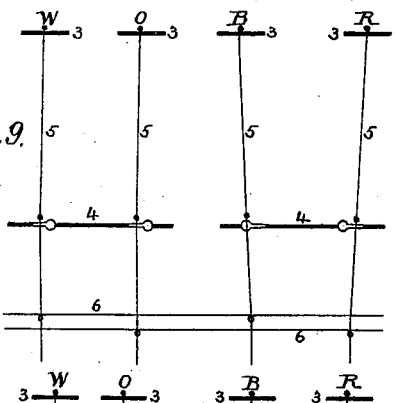
Figure 13:
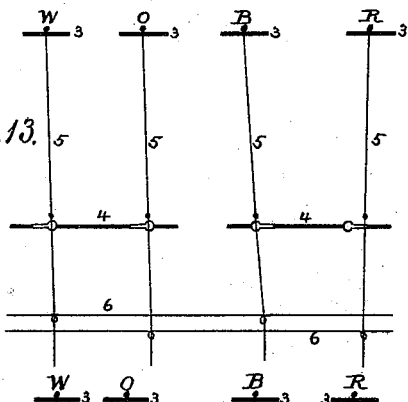
Figure 10:
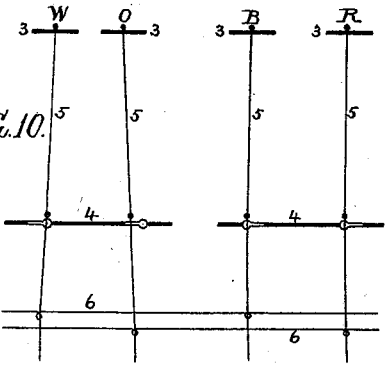
Figure 14:
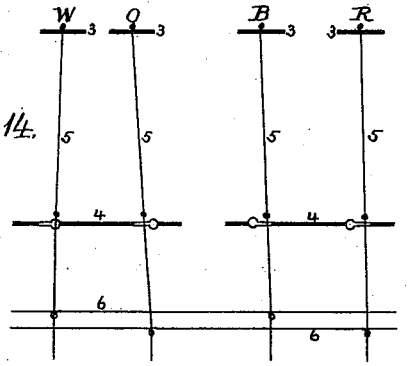
Figure 11:
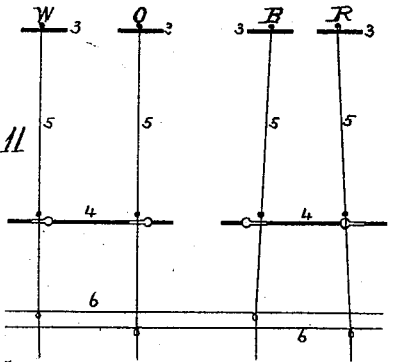
Figure 15:
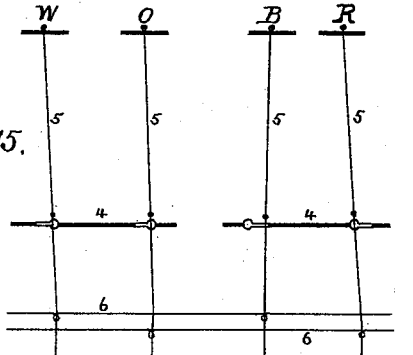

Figure 1 is a side view of sufficient of a loom to illustrate my invention. Fig. 2 is a side view, on a larger scale, of the Jacquard mechanism of the loom. Fig. 3 is a front view of said mechanism. Fig. 4 is a transverse section on the line 1 2, Fig. 3. Fig. 5 is a perspective view of part of the Jacquard mechanism. Fig. 6 is a plan view of the lifter-boards of the Jacquard mechanism. Fig. 7 is an enlarged view of a cam, forming part of the mechanism. Figs. 8 to 15, inclusive, are diagrams illustrating the operation of the controller-boards, forming one of the subjects of my invention; and Figs. 16 to 18 are diagrams and detail views illustrating modifications of the invention.

The frame-work 1 of the Jacquard machine is mounted on top of the loom-frame 2, as usual, and forms guides for the frames of supporting and controlling boards 3 and lifter-boards 4, the boards 3, which I will hereinafter term the "controller-boards," carrying the harness-tails 5, which pass through nicked eyes in the lifter-boards and are provided with knots above the same, the tails being also controlled by the needles 6, which are actuated by cards 7, carried by the card-cylinder 8 at the end of the machine, as usual, so that any one of the tails may be actuated by the needles in the usual manner for the purpose of bringing its knot into line either with the eye or the nick in the lifter-board. The boards 3 and 4 are caused to move vertically toward and from each other, being suspended by rods 10 from levers 9, which are vibrated by means of rods 11 from eccentrics 12 or other equivalent driving means on the shaft 13 of the loom, the latter being driven from the main shaft 14 by means of a spur-wheel 15 and pinion 16, which latter also engages with a spur-wheel 17 on a shaft 18, a pinion 19 on which engages with a spur-wheel 20 on a shaft 21, referred to hereinafter.

The Jacquard mechanism shown in the drawings is intended for a loom for weaving two-ply ingrain carpets and similar fabrics, and it has two lifter-boards 4, one for the tails controlling the two sets of ground-threads of the warp and the other for the tails controlling the two sets of figure-threads of the warp; but each of the controller-boards 3 is made in two sections, one for each set of the ground and figure tails, and these controller-board sections, in addition to their vertical movement, are susceptible of lateral movement toward and from each other, each section of board having at each end a lug 22, Fig. 5, which is adapted to a slot 23 in the bent end of a rod 24, suitably guided on the frame of the machine and connected at its outer end to an arm 25 on a rock-shaft 26. There are two of these rock-shafts, each having at each end two arms projecting in opposite directions therefrom, the arms of one shaft being connected to the sections of one controller-board, say, the sections carrying the ground-tails, while the arms of the other shaft are connected to the sections of the controller-board carrying the figuring-tails. As the rock-shafts 26 are vibrated, therefore, the sections of each controller-board are caused to move from and toward each other, this movement, owing to the pin-and-slot connection between the boards and their operating-arms, being effected without any interference with the vertical movement of the boards.

The shafts 26 are operated intermittingly by cam-disks 27 on the shaft 21, these disks acting on pivoted arms 28, which are connected by rods 29 to arms 30 on the said shafts 26, and each cam-disk 27 has its periphery in three circumferential surfaces, as shown in Fig. 7, so that each rock-shaft will be moved from one extreme position first to an intermediate position and then to the opposite extreme and back again in the same way, one shaft being in the intermediate position when the other shaft is in one of its extreme positions, as shown in Fig. 4. There will consequently be a like movement of the sections of the controller-boards 3, the sections of each board, after being separated, being first drawn together to the intermediate position, then fully drawn together, then partly separated to the intermediate position and then fully separated, and the sections of one board being in the intermediate position when the sections of the other board are in one of the extreme positions.

The nicks of the eyes of the lifter-boards 4 face in opposite directions, as shown in Fig. 6. For instance, those of the left-hand board, representing the ground-board, may project from the eyes toward the left, while those of the right-hand or figure board project toward the right.

When the sections of the ground controller-board are in the intermediate position, the knots of the tails carried thereby will be in line with the nicks in the lifter-boards unless the tails are otherwise adjusted by the needles, and when the sections of the figure controller-board are in the intermediate position the knots of the tails carried thereby will be in line with the eyes in the lifter-boards unless otherwise adjusted by the needles. When the sections of the ground controller-board are separated, however, all of the tails controlled by the left-hand section will be drawn outward, so that their knots will be over the nicks of the lifter-board however the needles may be adjusted, and when said sections are moved together the knots of the tails controlled by the right-hand section will be held in line with the nicks of the lifter-board irrespective of the dictation of the needles, and as regards the figure controller-board the knots of the tails carried by the left-hand section will be over the nicks of the lifter-board when the sections are together, the knots of the tails of the right-hand section being over the necks of the lifter-board when the sections are separated. The entire number of tails carried by each section of controller-board is thus placed under control of a lifter-board independently of the action of the needles upon the tails, and supposing that there is an operation of the lifter-boards for each pick of the loom, the lifting of this fractional portion of the entire number of harness tails takes the place of the usual operation of a section of the warp-threads by a harness-shaft, my improved jacquard, therefore, not only answering the ordinary purpose of a jacquard, but also the purpose of the usual independent harness-shafts. It may be said, then, that when the sections of a controller-board are in the intermediate position said board is inoperative, as it simply holds the harness-tails the same as an ordinary supporter-board, and the position of the tails in respect to the lifter-board is dictated solely by the needles; but when the sections of the supporter and controller boards are in either of their extreme positions said board is operative, as it adjusts the harness-tails so that their position in respect to the lifter-board is independent of the dictation of the needles, and said lifter-board operates as a substitute for a harness-shaft.

The diagrams Figs. 8 to 15 will serve to illustrate the eight different operations of the threads necessary in bringing up the ground and the figure in weaving the ordinary two-ply ingrain-carpet fabric. In these diagrams but one harness-tail is shown carried by each section of each controller-board, and those tails are lettered, respectively, W O B R, to indicate, say, the white, olive, black, and red threads of the warp to which said tails are connected. The weft-threads are thrown in the usual order of succession—say white, red, olive, and black—and Figs. 8, 9, 10, and 11 show the operation of the harness-tails to bring the white and olive ground wefts up, while Figs. 12, 13, 14, and 15 show the operation of the harness-tails to bring the red and black figuring wefts up. Thus on reference to Fig. 8 it will be seen that the white warp will only be lifted for binding the white weft on the surface, while on the next move, Fig. 9, the white, olive, and red warps will be lifted, leaving down the black to bind the red weft on the back, and on the next move, Fig. 10, the olive warp-thread only will be lifted for binding the olive weft on the face, and on the next move, Fig. 11, the white, olive, and black warps will be lifted, leaving down the red to bind the black weft on the back. On the next move, Fig. 12, the white, red, and black warps will be lifted prior to throwing in the white weft, so as to leave down olive to bind said white weft on the back, and on the next move, Fig. 13, the red warp only will be lifted for binding the red weft on the face, while on the next move, Fig. 14, the red, black, and olive warps will be lifted, leaving down the white to bind the olive weft on the back, and on the next move, Fig. 15, the black warp only will be lifted to bind the black weft on the face. It will be seen that each of the lifter-boards 4 acts alternately as a true lifter-board and as a substitute for the harness-shaft.

By "true lifter-board" I mean that the board acts to lift the threads in accordance with the dictation of the needles, while when the board acts as a substitute for the harness-shaft it lifts the threads in accordance with the dictation of the controller-board and not in accordance with the dictation of the needles. In carrying out this feature of my invention it is not absolutely necessary that the supporter and controller boards for the harness-tails should be made in sections movable laterally in respect to each other, as described, although this plan is preferred. I have, for instance, effectively carried out my invention by the use of controller-boards 3ª, interposed between supporter-boards 3 and the lifter-boards 4, as shown in Fig. 16, these boards being connected by rods to the arms 25 of the rock-shafts 26, so as to be moved toward and from each other, in the manner described.

When the direction of movement of the cards is reversed, it will sometimes be necessary to reverse the order of movement of the controller-boards, so that their movements will be in accord with the new order in which the cards are operated. This may be effected by reversing the direction of movement of the shaft 21, or by having two sets of cams 27 on said shaft, as shown in Fig. 17, one set of cams being properly timed for one order of movement of the cards and the other set for the reverse order, either set of cams being adjusted to operate upon the arms 28 as circumstances require, such adjustment being effected in the construction shown in Fig. 17 by moving the cam-carrying sleeve longitudinally on the shaft 21.

I have described the operation of my improved jacquard for the production of ordinary ingrain-carpet fabric; but it will be evident that it is equally available for the production of the improved carpet fabrics forming the subjects of my Patents, No. 353,135, dated November 23, 1886, and No. 382,157, dated May 1, 1888. For instance, the mate-thread effects described in the Patent No. 353,135 can be produced by simply changing the cards, as in the ordinary loom, the production of the fabric shown in Patent, No. 382,157 requiring the usual change in the cards, and necessitating at intervals a dwell in the operation of the controller-boards, while the lifter-boards make two movements.

In weaving carpets or rugs having borders, it is necessary to use two sets of cards, one set for weaving the borders at the ends of the rug or carpet and the other set for weaving the central portion of the fabric, and hitherto it has been considered necessary either to remove one set of cards from the loom and apply another set thereto or to use complicated duplex cylinder mechanism, both of which plans are objectionable, the first on account of the loss of time which it involves in the change, and the second because of the expense of the structure. In carrying out my invention, therefore, I extend the cylinder-shaft 31 of the Jacquard mechanism on each side of the cylinder 8 to an extent equal to or in excess of the width of a card, (see Fig. 3,) the operating mechanism for the cylinder being located at the ends of this shaft, and I am thereby enabled to use two sets of cards, one set occupying the cylinder and the other set occupying a position laterally at one side of said cylinder, so that in effecting the change it is simply necessary to shift the set of cards from the cylinder to one side and to draw the formerly inoperative set of cards onto the cylinder from the opposite side.

I provide a special supporting bar or plate 32, upon which the inoperative set of cards may be hung, and by which it is retained in precisely the same position in which it was removed from the cylinder, so that when replaced upon the latter it will be in position to at once resume the weaving operation.

The cylinder-shaft may, if desired, have two cylinders, each carrying a set of cards and each movable on the shaft into operative position opposite the needles, or into an inoperative position at one side of the needle-space, such a modification being shown in Fig. 18. In this case the central portion of the shaft should be of polygonal cross-section, as shown at 31', or should be provided with a suitable spline, so that when the cylinder is adjusted to this portion of the shaft it will necessarily turn therewith, while when adjusted to either of the side projecting portions of the shaft it will hang loosely on said shaft and may be prevented from turning in any suitable manner.

I am aware that a lifter-bar of a Jacquard machine has been provided with gratings mounted thereupon and capable of moving laterally on the lifter-bar so as to throw all of the threads controlled by said bar into the nicks of the same; but in my Jacquard apparatus the sections of the controller-bar instead of acting simultaneously, as in the previous device, act alternately—that is to say, one is operative when the sections are separated and the other is operative when the sections are together. I am also aware that the sections of the lifter-bar have been moved so that one or more of the sections would control the harness-tails independently of the dictation of the needles; but the objection to the laterally-movable lifter-bar is that when it is adjusted so as to act on the harness-tails independently of the needles it imparts excessive strain to the needles, owing to the fact that the latter are close up under the lifter-bar. This objection is overcome by the use of the controller-bars mounted above the lifter-bar in accordance with my invention.

Having thus described my invention, I claim and desire to secure by Letters Patent—

1. The combination of the harness tails and needles of a Jacquard machine, a lifter-bar having two sets of openings, a controller-bar located above the lifter-bar and composed of two sections, and means for moving said sections, whereby the harness-tails first in one set of openings and then in the other set of openings of the lifter-bar are caused to assume an operative position independently of or in opposition to any movement of said tails by the needles of the machine, substantially as specified.

2. The combination of the harness tails and needles of a Jacquard machine, a lifter-bar, a combined supporter and controller bar above the same, and means for imparting lateral movement to said combined supporter and controller bar, whereby the harness-tails are shifted in respect to the lifter-bar independently of the needles, substantially as specified.

3. The combination of the harness tails and needles of a Jacquard mechanism with a lifter board, a supporter and controller board above the same composed of sections movable laterally in respect to each other, an operating-cam having three circumferential surfaces, and intervening mechanism through which said cam acts on the sections of the supporter and controller board, whereby the latter may be adjusted to either extreme or to an intermediate position, all substantially as specified.

4. The combination of the harness tails and needles, the lifter-board, the sectional controller-board, a rock-shaft having opposite arms, one connected to one section of the controller-board and the other to the other section of the same, and means for vibrating said rock-shaft, all substantially as specified.

5. The combination of the harness tails and needles, the lifter-board, the sectional controller-board, the rock-shaft having opposite arms, rods connecting said arms to the sections of said controller-board, and pin-and-slot connections between the rods and the sections of the board, all substantially as specified.

6. The combination of the harness tails and needles, the lifter-board, the sectional controller-board above the same, means for laterally moving the sections of the controller-board in respect to each other, and mechanism for vertically reciprocating both the lifter-board and the controller-board, all substantially as specified.

7. The combination of the harness tails and needles, two lifter-boards, a controller-board located above each lifter-board and composed of sections movable into operative or inoperative position, and means for moving into operative position first the sections of one controller-board and then those of the other board, all substantially as specified.

8. The combination of the needles of a Jacquard machine, the card-cylinder, a cylinder-shaft projecting laterally beyond the needle-space to an extent equal to the width of a card, so as to accommodate an inactive set of cards, and a support for said inactive set of cards, all substantially as specified.

In testimony whereof I have signed my name to this specification in the presence of two subscribing witnesses.

HARRY HARDWICK.

Witnesses:
G. I. HARDING,
R. G. MONROE.